United States Patent [19]

Wooten

[11] 4,205,878
[45] Jun. 3, 1980

[54] PULL OUT HEADREST

[76] Inventor: James D. Wooten, P.O. Box E, 517 S. 13 Hwy., Lexington, Mo. 64067

[21] Appl. No.: 930,353

[22] Filed: Aug. 2, 1978

[51] Int. Cl.² .............................................. A47C 1/10
[52] U.S. Cl. ................................... 297/391; 297/396; 297/406; 297/464
[58] Field of Search ............... 297/391, 396, 400, 403, 297/406, 407, 409, 410, 384; 248/118

[56] References Cited

U.S. PATENT DOCUMENTS

| 2,652,101 | 9/1953 | Samsky et al. | 297/403 X |
| 2,908,766 | 10/1959 | Taylor | 297/391 X |
| 3,168,346 | 2/1965 | Rei, Jr. | 297/117 X |
| 3,888,540 | 6/1975 | Protze et al. | 297/117 X |
| 3,934,934 | 1/1976 | Farrell, Jr. et al. | 297/384 |

FOREIGN PATENT DOCUMENTS

| 2052514 | 6/1972 | Fed. Rep. of Germany | 297/391 |
| 225370 | 3/1968 | Sweden | 297/396 |
| 1411528 | 10/1975 | United Kingdom | 297/391 |

*Primary Examiner*—James T. McCall
*Attorney, Agent, or Firm*—Schmidt, Johnson, Hovey & Williams

[57] ABSTRACT

A pull out headrest for use with a seat structure having an extended backrest comprises two receiving chambers on either side of the extended backrest. Two headrest members have a first position wherein the members are withdrawn into the chambers. Individual adjusting elements connect the headrest members to the backrest for supporting the headrest members in a second position.

4 Claims, 7 Drawing Figures

PULL OUT HEADREST

BACKGROUND OF THE INVENTION

While the invention is subject to a wide range of applications it is especially suited for conventional vehicle seat structures and will be particularly described in that connection.

Among the problems involved in conventional vehicle seat structures is that a passenger has difficulty in either resting his head, or in sleeping.

It is an object of the present invention to provide a pull out headrest which improves the comfort of conventional vehicle seat structures.

It is a further object of the present invention to provide a pull out headrest which is inexpensive to manufacture.

SUMMARY OF THE INVENTION

In accordance with the present invention, there is disclosed a pull out headrest for use with a seat structure having an extended backrest comprising two receiving chambers on either side of the extended backrest. Two headrest members having a first position where the members are withdrawn into the chambers. Individual adjusting elements connect the headrest members to the backrest for supporting the headrest members in a second position.

For a better understanding of the present invention, together with other and further objects thereof, reference is made to the following description, taken in connection with the accompanying drawings, while its scope will be pointed out in the appended claims.

DESCRIPTION OF THE PREFERRED EMBODIMENT

Figure 7:
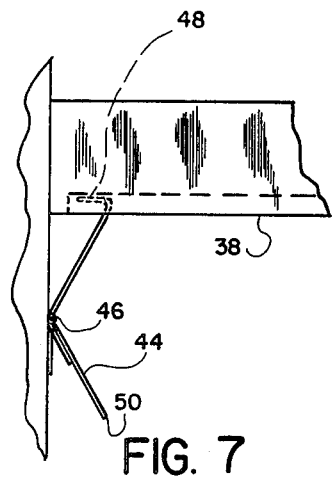
FIG. 7 is a view, illustrating a spring member retaining a pull out headrest on a guide bar.
Figure 1:
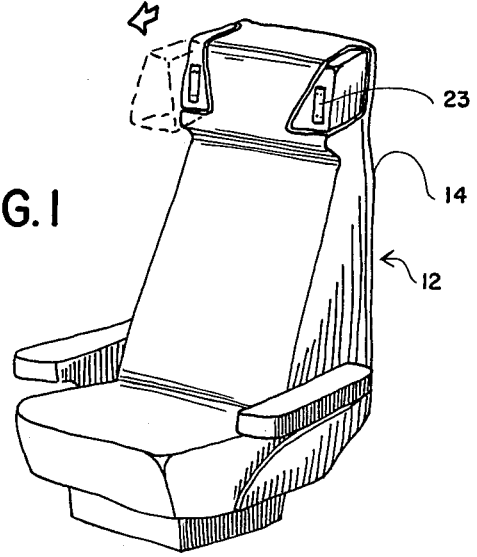
FIG. 1 is an illustration of a pull out headrest together with a seat structure in accordance with the present invention.

In accordance with the present invention, a pull out headrest 10 for use with a seat structure 12 having an extended backrest 14 comprises two receiving chambers 16 on either side of the extended backrest. Two headrest members 18 have a first position wherein the members are withdrawn into the chambers 16. Individual adjusting element 20 connects the headrest members to the backrest for supporting the headrest members in a second position.

Figure 2:
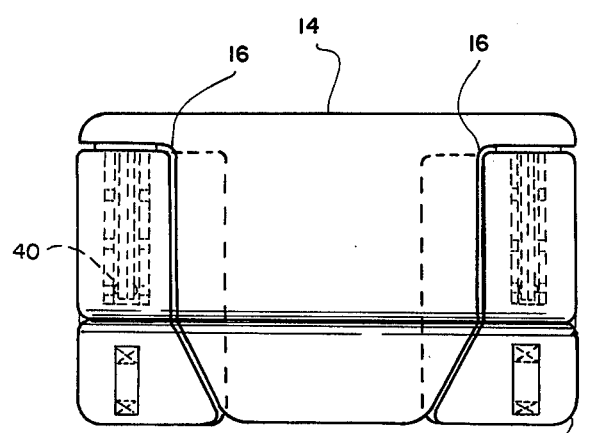
FIG. 2 is a top view illustrating a seat structure with a pull out headrest on either end.
Figure 3:
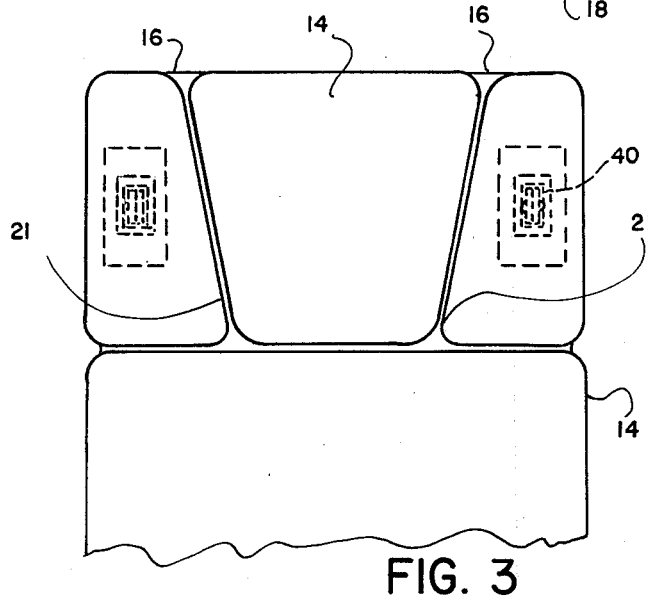
FIG. 3 is a front view of a seat with a pull out headrest.
Figure 4:
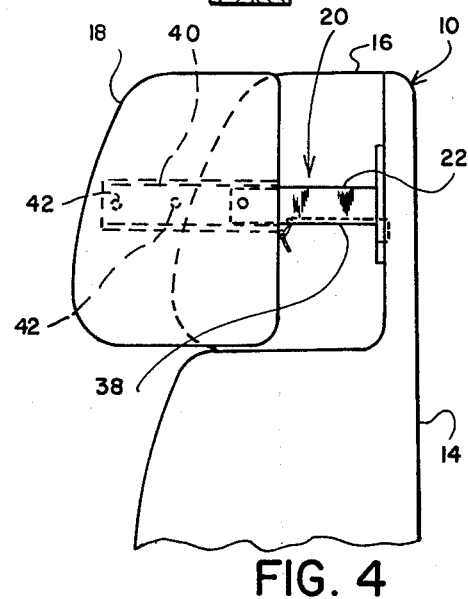
FIG. 4 is a side view of a pull out headrest in an extended position.

Referring to FIG. 4, there is illustrated an extended backrest 14 having a receiving chamber 16. As best seen in FIGS. 2 and 3, the headrest members 18 are fitted into the receiving chambers 16 so as to be flush with the front and sides of the extended backrest 14. Headrest members 18 have a sloping side 21 against which a person may comfortably rest his head when the headrest members positioned outside of receiving chambers 16. Handles 23 are provided on members 18 and they may be made of any material such as for example elastic. The headrest members may be made of any conventional material such as for example that material of which seat structure 12 is made.

Figure 5:
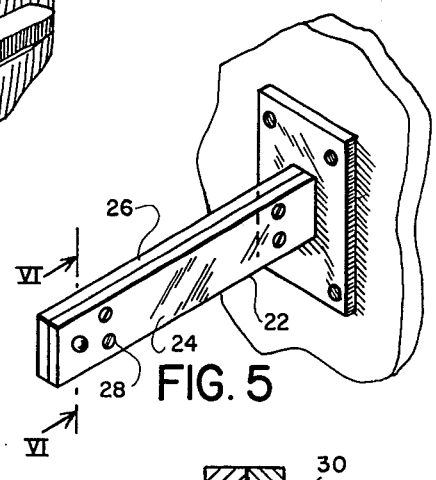
FIG. 5 is a view, illustrating a guide bar.
Figure 6:
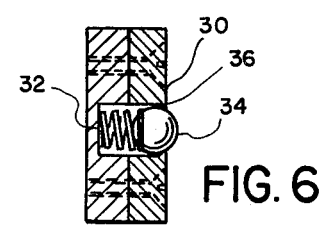
FIG. 6 is a view through VI—VI of FIG. 5.

An individual adjustable member 20 includes a guide bar 22, see FIG. 5. The guide bar may be made, of two pieces 24 and 26 which may be joined together by any means, such as for example screws 28. A detent mechanism 30, see FIG. 6 includes a spring 32 which biases a ball 34 against a stopping base 36. In addition, a stop groove 38, see FIG. 7 is provided in the bottom bace of guide bar 22. A guide recess 40 is provided in each of said headrest members 18 and is sized to slidably receive guide bar 22. The guide recess 40 includes a plurality of indentations 42 which engage the detent mechanism 30. A spring hinge 44 is pivotally fixed to headrest member 18 at a point 46 and includes a hooked end 48, as best seen in FIG. 7. The spring hinge may be rotated about pivot point 46 by pushing against end 50 so as to move hook 48 out of engagement with the stop groove 38 in which it rides.

In actual practice, a person may pull out either or both of headrest members 18 from their receiving chambers 16 by means of the handles 23 to a plurality of positions according to the number of indentations 42. When the headrest member reaches the desired position, detent ball 34 is biased into the indentation 42. In this way, a person can comfortably rest his head against the slanted surface 21. The spring hinge 44 prevents the headrest member from completely coming off of the guide bar 22 due to a fast stop or an accident of a vehicle in which the seat structure is contained. In the event that the headrest member requires to be completely removed from the extended backrest 14, by simply pushing end 50 of the spring 44, the hook 48 will disengage from the groove 38 and permit the complete removal of headrest member 18.

One skilled in the art will realize that there has been disclosed a pull out headrest that improves the comfort of conventional vehicle seat structures and is inexpensive to manufacture.

While there has been described what is at present considered a preferred embodiment of the invention, it will be obvious to those skilled in the art that various changes and modifications may be made therein without departing from the invention, and it is, therefore aimed in the appended claims to cover all such changes and modifications as followed in the true spirit and scope of the invention.

What is claimed is:

1. A pull out headrest for use with a seat structure having an extended backrest comprising, two receiving chambers on either side of said extended backrest, two headrest members having a first position wherein said members are withdrawn into said chambers, individual adjusting means connecting said headrest members to said backrest for supporting said headrest members in a second position.

2. The pull out headrest as defined in claim 1 further characterized in that said individual adjusting means supports said headrest members in a plurality of positions.

3. The pull out headrest as defined in claim 2 further characterized in that said individual adjusting means includes a guide bar having a detent mechanism in each of said receiving chambers, a guide recess in each of said headrest members having a plurality of indentations whereby said guide recess can be moved along said guide bar and be secured in any position where the detent mechanism engages an indentation.

4. The pull out headrest as defined in claim 3 further characterized in that said individual adjusting means includes a spring hinge attached to each of said headrest members, said guide bars including a stop groove for receiving said spring hinge to prevent either of said headrests from being accidentally detached from said guide bars.

* * * * *